United States Patent
Campbell et al.

(10) Patent No.: US 12,196,709 B2
(45) Date of Patent: Jan. 14, 2025

(54) DETERMINING CURTAIN PLATE INTEGRITY IN DIFFERENTIAL MOBILITY SPECTROMETRY

(71) Applicant: DH TECHNOLOGIES DEVELOPMENT PTE. LTD., Singapore (SG)

(72) Inventors: John Lawrence Campbell, Milton (CA); Brendon Seale, Toronto (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 375 days.

(21) Appl. No.: 17/758,646

(22) PCT Filed: Jan. 14, 2021

(86) PCT No.: PCT/IB2021/050256
§ 371 (c)(1),
(2) Date: Jul. 12, 2022

(87) PCT Pub. No.: WO2021/144733
PCT Pub. Date: Jul. 22, 2021

(65) Prior Publication Data
US 2023/0084101 A1 Mar. 16, 2023

Related U.S. Application Data

(60) Provisional application No. 62/960,736, filed on Jan. 14, 2020.

(51) Int. Cl.
*G01N 27/624* (2021.01)
*G01N 27/623* (2021.01)

(52) U.S. Cl.
CPC ......... *G01N 27/624* (2013.01); *G01N 27/623* (2021.01)

(58) Field of Classification Search
CPC .... H01J 49/004; H01J 49/145; H01J 49/0422; H01J 49/0031; G01N 27/623; G01N 27/624
See application file for complete search history.

(56) References Cited

FOREIGN PATENT DOCUMENTS

WO WO-2016108126 A1 * 7/2016 ........... G01N 27/624

OTHER PUBLICATIONS

International Search Report and Written Opinion for PCT/IB2021/050256, mailed Apr. 26, 2021.
(Continued)

*Primary Examiner* — David E Smith
*Assistant Examiner* — Hsien C Tsai
(74) *Attorney, Agent, or Firm* — Potomac Law Group, PLLC; Reza Mollaaghababa; Ido Rabinovitch

(57) ABSTRACT

A DMS device receives a curtain gas that includes a chemical modifier into its curtain plate. Before or while receiving ions of an analyte, the DMS device steps the CoV through a series of values in order to apply different CoV values to at least one precursor ion derived from the chemical modifier. For each CoV value of the series of values, a mass spectrometer selects and mass analyzes the at least one precursor ion. An intensity is produced for each CoV value of the series of values. An intensity versus CoV value peak is calculated from the intensities measured. A representative CoV value is calculated for the peak. The difference between the representative CoV value and known CoV values that represent an uncontaminated curtain plate is calculated. If the difference is greater than or equal to a predetermined threshold value, the curtain plate is determined to be contaminated.

16 Claims, 13 Drawing Sheets

(56) References Cited

OTHER PUBLICATIONS

Kang Yang et al.: "On the Nature of Mass Spectrometer Analyzer Contamination," Journal of the American Society for Mass Spectrometry, Elsevier Science In., US, vol. 28, No. 11, Jul. 21, 2017, pp. 2384-2392, XP036342202.

Schineider B.B. et al.: "Planar Differential Mobilit Spectrometer as a Pre-Filter for Atmaspheric Pressure Ionization Mass Spectrometry," International Journal of Mass Spectrometry, Elsevier Science Publishers, Amsterdam, NL, vol. 298, No. 1-3, Dec. 1, 2010, pp. 45-54, XP027492682.

* cited by examiner

DETERMINING CURTAIN PLATE INTEGRITY IN DIFFERENTIAL MOBILITY SPECTROMETRY

RELATED US APPLICATIONS

This application claims the benefit of priority from U.S. Provisional Application Ser. No. 62/960,736, filed on Jan. 14, 2020, the entire contents of which is hereby incorporated by reference.

INTRODUCTION

The teachings herein relate to operating a differential mobility spectrometry (DMS) device and a mass spectrometer to determine a DMS is able to perform an analysis such as for example determining if the curtain plate of the DMS is contaminated. More particularly, the teachings herein relate to systems and methods that analyze an ion derived from a chemical modifier to determine if the curtain plate of a DMS device is contaminated and the system is able to perform an analysis. The systems and methods disclosed herein can be performed in conjunction with a processor, controller, microcontroller, or computer system, such as the computer system of FIG. 1.

DMS Curtain Plate Contamination Background

Often users of DMS devices could have issues reproducing otherwise stable compensation voltages (CoVs) for given analytes of interest. In some cases, the desired CoV will have shifted by virtue of some unknown and unforeseen experimental variable, often requiring a great deal of field service level intervention and some confusion on the part of the users.

It has been observed that one cause of shifting CoV values for analyte ions is the use of a contaminated curtain plate that is part of a curtain assembly. Essentially, when a curtain plate is employed in a DMS experiment, it is used to provide the heating of the DMS cell, as well as to act as a diffuser and mixer for any volatile chemical modifiers that are added to the DMS carrier gas (i.e., the curtain gas). The expectation is that, once the DMS and curtain plate hardware are positioned and temperatures are dictated by analysis software, the user is approximately 30 minutes away from achieving stable, repeatable CoV measurements for a given analyte ion. In most cases, this is exactly what takes place. Besides channeling and heating the DMS cell's transport gas, the curtain plate also serves to help desolvate ions before entry into the mass spectrometer and DMS, as well as to block chemical matrix and their clusters from entry into the DMS and/or mass spectrometer. This can result in contamination of the curtain plate over time of usage.

However, it has been observed on occasion that, under controlled conditions using heavily used DMS curtain plates a standard 30-minute equilibration period at operating temperatures (usually 150° C.) and curtain gas settings (CUR pressure=20 psi) does not produce the expected CoV shifts for a great many analyte ions. This is especially true of ions with m/z values below 400. In other words, curtain plate contamination appears to affect the reproducibility of CoV values adversely for analyte ions.

If curtain plate contamination can be discovered, there are a number of remedies for the problem. For example, the ultimate remedy to this problem is to disassemble the curtain plate completely, replacing the ceramic beads and clean the heater and curtain plate thoroughly. Unfortunately, this intervention requires a great deal of down time and manual labor. Another simpler solution involves equilibrating the dirty curtain plate for an extended period of time (45 minutes) under higher temperature (~300° C.) and curtain gas flow (CUR pressure=50 psi).

However, whichever solution is chosen, a user still must evaluate the degree of incorrect CoV shift for a given ion (often, an analyte ion) before such a curtain plate cleaning intervention is implemented. In other words, a user must determine that curtain plate cleaning is required before taking on the expense of cleaning the curtain plate.

Currently, there are no diagnostic tests available to assess the status of the curtain plate of a DMS device before or while an analyte ion is being analyzed. As a result, systems and methods are needed to determine if the curtain plate of a DMS device is contaminated.

DMS Device Background

FIG. 2 is a schematic diagram 200 of an exemplary DMS device. DMS device 200 includes two parallel flat plates, plate 210 and plate 220. Radio frequency (RF) voltage source 230 applies an RF separation voltage (SV) across plate 210 and plate 220, and direct current (DC) voltage source 240 applies a DC compensation voltage (CoV) across plate 210 and plate 220. Ions 250 enter DMS device 200 in a transport gas at opening 260. Unlike traditional ion mobility, ions 250 are not separated in time as they traverse the device. Instead, ions 250 are separated in trajectory based on the difference in their mobility between the high field and low field portions of applied RF voltage source 230. The high field is applied between plate 210 and plate 220 for a short period of time, and then a low field is applied in the opposite direction for a longer period of time. Any difference between the low-field and high-field mobility of an ion of a compound of interest causes it to migrate towards one of the plates. The ion is steered back towards the center-line of the device by the application of a second voltage offset, known as the CoV of DC voltage source 240, a compound-specific parameter that can be used to filter out all other ions selectively. Rapid switching of the CoV allows the user to monitor many different compounds concurrently. Ions 270 selected by the combination of SV and CoV leave DMS device 200 through opening 280 to the remainder of the mass spectrometer (not shown). DMS device 200 is located between an ion source device (not shown) and the remainder of the mass spectrometer, for example.

In general, DMS device 200 has two modes of operation. In the first mode, DMS device 200 is on, SV and CoV voltages are applied, and ions are separated. This is, for example, the enabled mode.

In the second mode of operation, DMS device 200 is off, the SV is set to zero and ions 250 are simply transported from opening 260 to opening 280. This is, for example, the disabled or transparent mode of DMS device 200.

In the enabled mode, DMS device 500 can acquire data for a single MRM transition in 25 milliseconds (ms), for example, including an inter-scan pause time of 20 ms. In transparent mode, the delay through DMS device 500 is negligible.

Background on Mass Spectrometry Techniques

Mass spectrometers are often coupled with chromatography or other separation systems, such as ion mobility, in order to identify and characterize eluting known compounds of interest from a sample. In such a coupled system, the eluting solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in the sample. More particularly, the retention times of peaks and/or the area of peaks are used to identify or characterize (quantify) a known peptide or compound in the sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, $MS/MS^{ALL}$. In an $MS/MS^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the $MS/MS^{ALL}$ method, all the precursor ions in each precursor ion mass selection window are fragmented, and all of the product ions of all of the precursor ions in each mass selection window are mass analyzed.

SUMMARY

A system, method, and computer program product are disclosed for determining if a curtain plate of a DMS device is contaminated, in accordance with various embodiments. The system includes a DMS device and a mass spectrometer.

The DMS device includes a curtain plate. The DMS device receives a curtain gas that includes a chemical modifier into the curtain plate. Before or while receiving ions of an analyte, the DMS device performs a diagnostic experiment in which the CoV of the DMS device is stepped through a series of values in order to apply different CoV values to at least one precursor ion derived from the chemical modifier. Also during the diagnostic experiment, for each CoV value of the series of values, the mass spectrometer selects the at least one precursor ion and mass analyzes the at least one precursor ion, producing an intensity for each CoV value of the series of values for the at least one precursor ion.

The mass spectrometer calculates an intensity versus CoV value peak from the intensities measured for each CoV value of the series of values for the at least one precursor ion. The mass spectrometer calculates a representative CoV value for the peak. The mass spectrometer calculates an absolute value of the difference between the representative CoV value and a known CoV value or a range of known CoV values that represent an uncontaminated curtain plate. If the absolute value of the difference is greater than or equal to a predetermined threshold value, the mass spectrometer determines that the curtain plate is contaminated and initiates a protocol for resolving this issue.

In other embodiments, a system for determining if a differential mobility spectrometry (DMS) device is suitable to perform an analysis is described. The system, comprising: a DMS device that includes a curtain assembly, the current assembly being configured to receive a curtain gas that includes a chemical modifier, the DMS device being configured to, before or while receiving ions, perform a diagnostic experiment in which a compensation voltage (CoV) of the DMS device is stepped through a series of values in order to transmit at least one precursor ion derived from the chemical modifier present in the curtain gas; and a mass spectrometer that, during the diagnostic experiment, for each CoV value of the series of values, selects the at least one derived precursor ion and mass analyzes the at least one derived precursor ion, producing an intensity for each CoV value of a series of values for the at least one derived precursor ion, calculates an intensity versus CoV value peak from the intensities measured for each CoV value of the series of values for the at least one derived precursor ion, calculates a representative CoV values for the peak, calculates an absolute value of the difference between the representative CoV value and a known CoV value or a range of known CoV values that represents a properly functional DMS, and if the absolute value of the difference is greater than or equal to a predetermined threshold value, determines that the system is not suitable for analysis.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
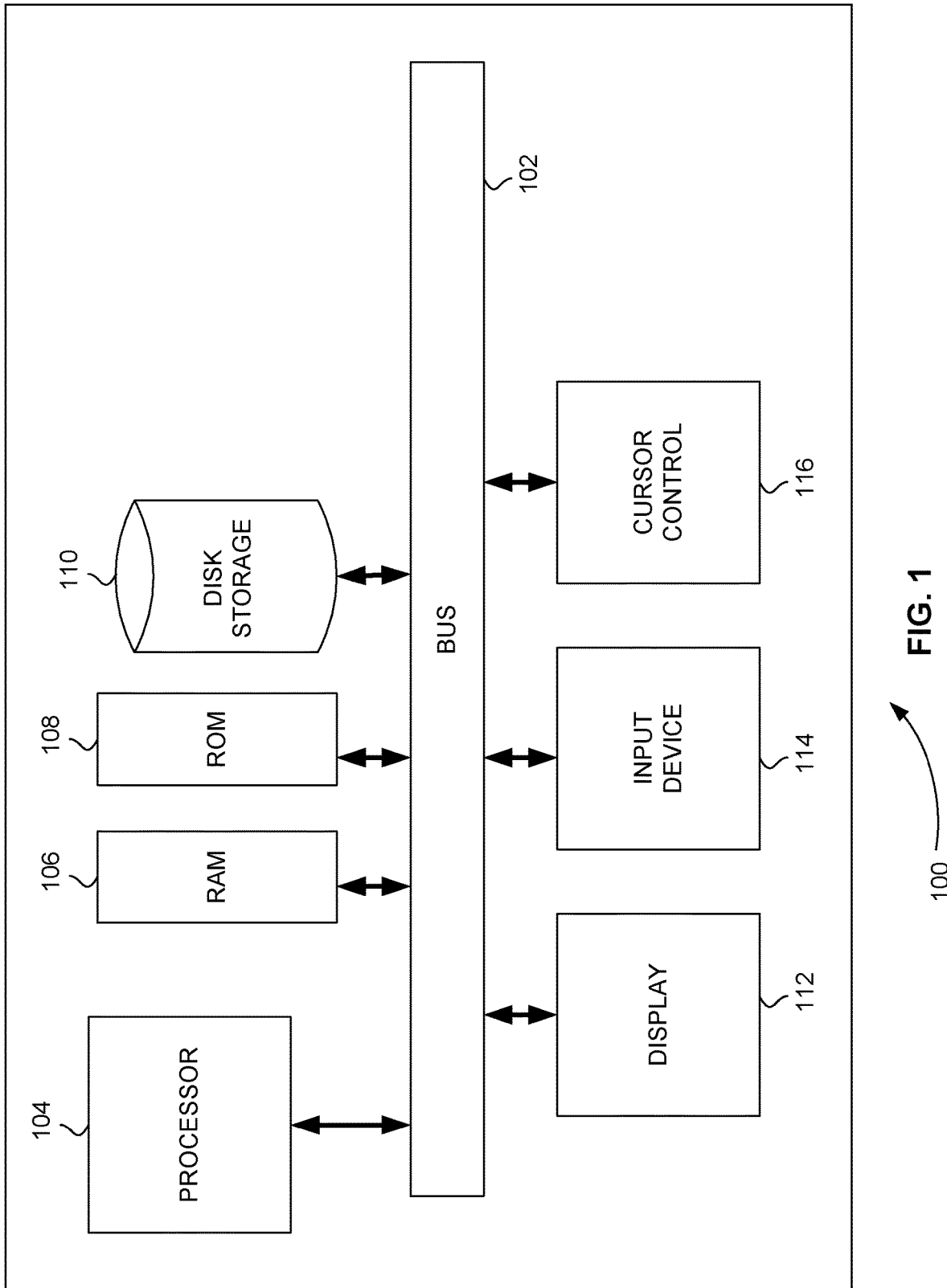
FIG. 1 is a block diagram that illustrates a computer system, upon which embodiments of the present teachings may be implemented.
Figure 2:
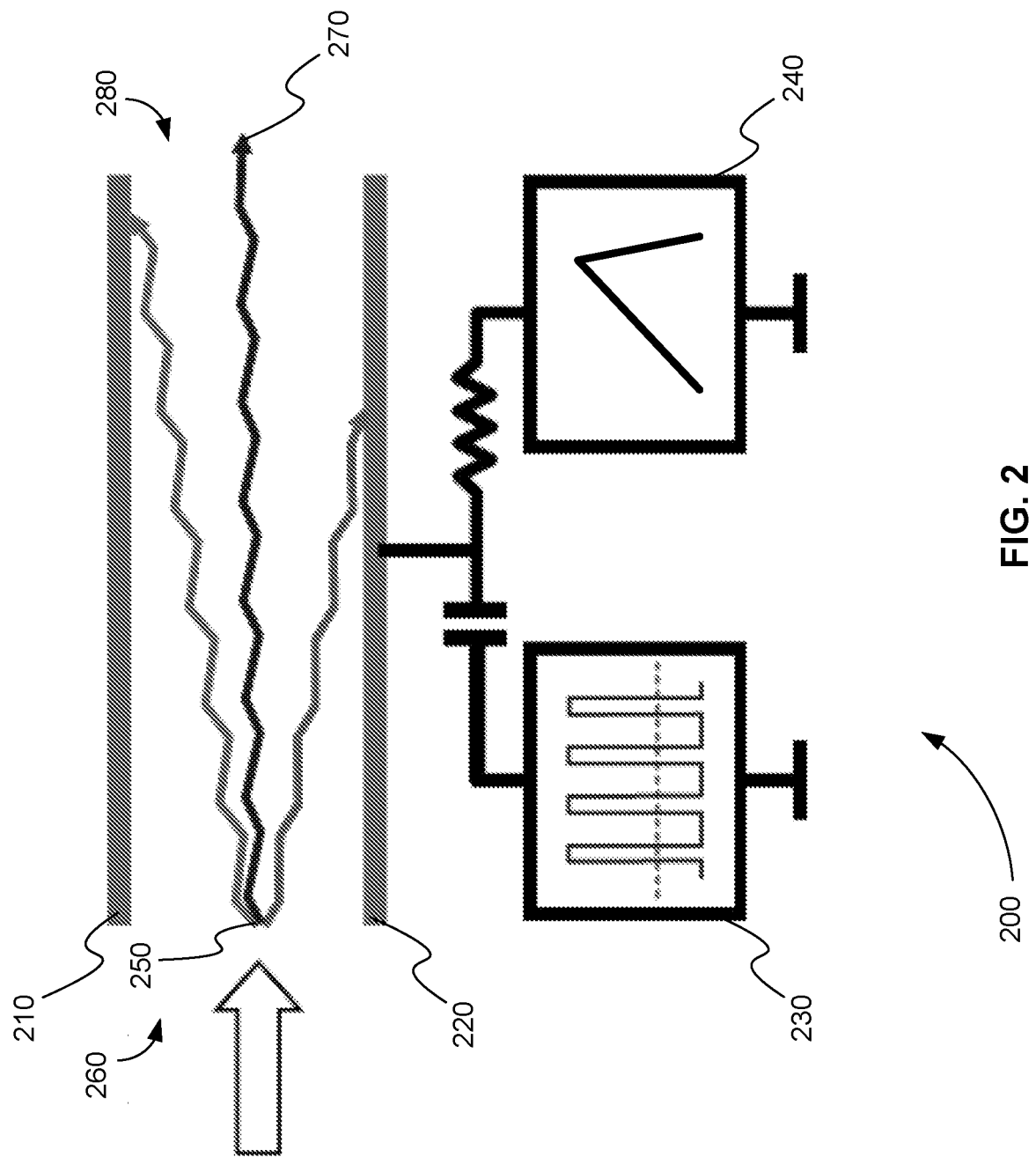
FIG. 2 is a schematic diagram of an exemplary differential mobility spectrometry (DMS) device.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Determining Curtain Plate Contamination

As described above, often users of DMS devices have issues reproducing otherwise stable compensation voltages (CoVs) for given analytes of interest. In some cases, the desired CoV will have shifted by virtue of some unknown and unforeseen experimental variable, often requiring a great deal of field service level intervention and some confusion on the part of the users. In some embodiments, it is desirable to determine if the DMS device is suitable to perform an analysis.

It has been observed that one cause of shifting CoV values for analyte ions is the use of a contaminated curtain plate. If curtain plate contamination can be discovered, there are a number of solutions to the problem. However, whichever solution is chosen, a user still must evaluate the degree of incorrect CoV shift for a given ion (often, an analyte ion) before such a curtain plate cleaning intervention is implemented. In other embodiments, the curtain plate may be associated with a curtain assembly and the determination of whether the DMS device is suitable to perform an analysis can include the aforementioned contamination of the curtain plate or other aspects within the DMS that may affect the performance of the DMS, which can include, but is not limited to the readiness and/or performance of other components such as heaters or the improper mounting of the device.

Unfortunately, there are currently no diagnostic tests available to assess the status of the curtain plate or other components of a DMS device before or while an analyte ion is being analyzed. As a result, systems and methods are needed to determine if the curtain plate or other components of a DMS device is contaminated or not ready.

In various embodiments, an ion derived from a chemical modifier is used to determine if the DMS is suitable for performing an analysis, which can include detecting that the curtain plate of a DMS device is contaminated. More specifically, before or while an analyte ion is analyzed by a DMS coupled mass spectrometer in an experiment, at least one ion derived from a chemical modifier commonly used in DMS experiments is analyzed in a diagnostic experiment.

The at least one ion is mass analyzed over a series of different CoV values, producing a series of intensity versus CoV values for the at least one ion.

A known CoV value or range of known CoV values that provide the highest intensity for the at least one ion when a curtain plate is new or clean or the DMS is suitable to perform an analysis are compared to at least one CoV value providing the highest intensity in the diagnostic experiment. If the at least one CoV value providing the highest intensity in the diagnostic experiment is shifted by greater than a predetermined threshold from the known CoV value or range of known CoV values, then the curtain plate is determined to be contaminated or the DMS is determined to not be suitable to perform an analysis.

Chemical modifiers commonly used in DMS experiments include, but are not limited to, methanol, isopropanol, or acetonitrile. An ion of a chemical modifier or an ion derived from or related to a chemical modifier can be used determine the status of the curtain plate. An ion derived from or related to a chemical modifier is, for example, an adduct. Ionization often occurs by adding a proton to a molecule producing an $[M+H]^+$ ion, but other forms, known as adducts, can be produced by adding alkali metal ions such as sodium ($Na^+$) to give $[M+Na]^+$, potassium $[M+K]^+$ or lithium $[M+Li]^+$.

An adduct of a chemical modifier moves the chemical modifier into a higher mass range so that it is more easily mass analyzed. For example, a sodiated methanol ion can be measured using most types of mass analyzers.

Figure 3:
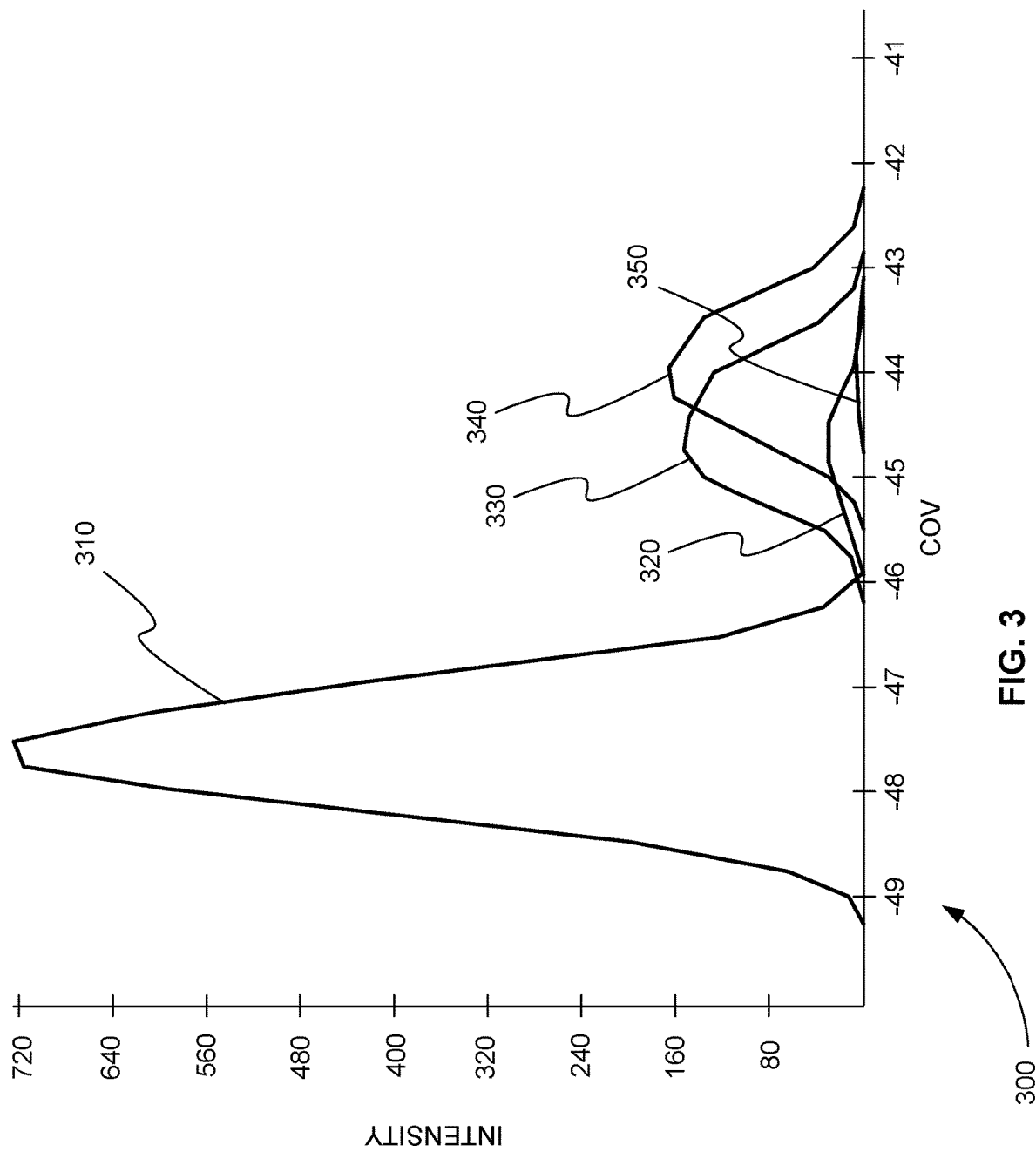
FIG. 3 is an exemplary plot of intensity versus compensation voltage peaks for a derived ion, $[MeOH+Na]^+$ (m/z 55.015), from the chemical modifier methanol (MeOH) measured from one MS-TOF diagnostic experiment using a contaminated curtain plate and from four other MS-TOF diagnostic experiments using new, cleaned, or aggressively baked out curtain plates, in accordance with various embodiments.

FIG. 3 is an exemplary plot 300 of intensity versus compensation voltage peaks for a derived ion, $[MeOH+Na]^+$ (m/z 55.015), from the chemical modifier methanol (MeOH) measured from one MS-TOF diagnostic experiment using a contaminated curtain plate and from four other MS-TOF diagnostic experiments using new, cleaned, or aggressively baked out curtain plates, in accordance with various embodiments. In plot 300, peak 310 is from the diagnostic experiment using a contaminated curtain plate. Peaks 320, 330, 340, and 350 are from the four other MS-TOF diagnostic experiments using new, cleaned, or aggressively baked out curtain plates.

The CoV of peak 310 is significantly shifted away from the CoVs of peaks 320, 330, 340, and 350. Specifically, the CoV, −47.5 V, of peak 310 is shifted from the CoV values of peaks 320, 330, 340, and 350 by more than a predetermined threshold value, such as 2 V. As a result, plot 300 shows that the derived ion, $[MeOH+Na]^+$ (m/z 55.015), from the chemical modifier methanol can be used to determine if the curtain plate of a DMS device is contaminated.

Figure 4:
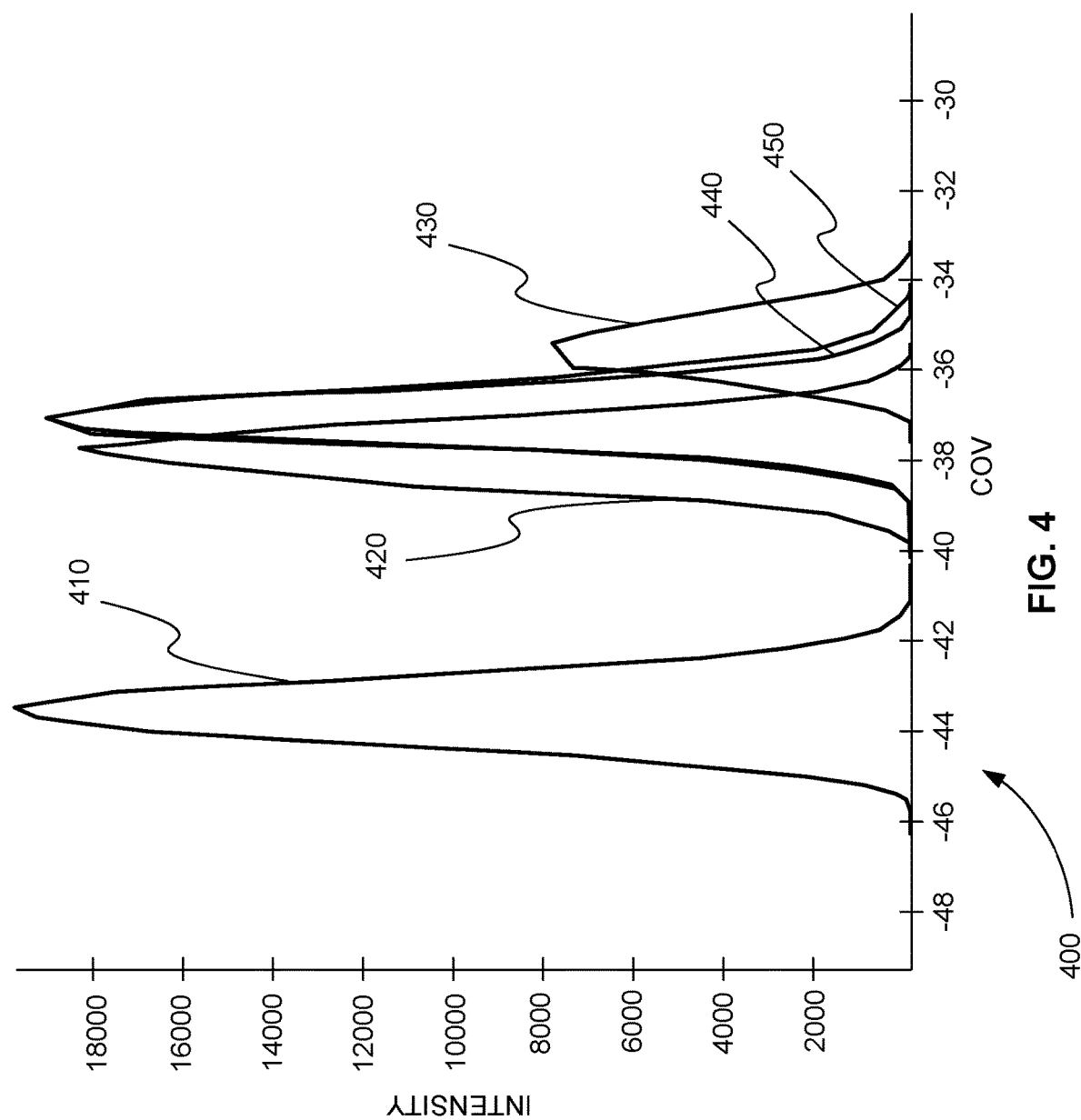
FIG. 4 is an exemplary plot of intensity versus compensation voltage peaks for a derived ion, $[IPA+H]^+$ (m/z 61.060), from the chemical modifier isopropanol (IPA) measured from one MS-TOF diagnostic experiment using a contaminated curtain plate and from four other MS-TOF diagnostic experiments using new, cleaned, or aggressively baked out curtain plates, in accordance with various embodiments.

FIG. 4 is an exemplary plot 400 of intensity versus compensation voltage peaks for a derived ion, $[IPA+H]^+$ (m/z 61.060), from the chemical modifier isopropanol (IPA) measured from one MS-TOF diagnostic experiment using a contaminated curtain plate and from four other MS-TOF diagnostic experiments using new, cleaned, or aggressively baked out curtain plates, in accordance with various embodiments. In plot 400, peak 410 is from the diagnostic experiment using a contaminated curtain plate. Peaks 420, 430, 440, and 450 are from the four other MS-TOF diagnostic experiments using new, cleaned, or aggressively baked out curtain plates.

The CoV of peak 410 is significantly shifted away from the CoVs of peaks 420, 430, 440, and 450. Specifically, the CoV, −43.5 V, of peak 410 is shifted from the CoV values of peaks 420, 430, 440, and 450 by more than a predetermined threshold value, such as 4 V. As a result, plot 400 shows that the derived ion, $[IPA+H]^+$ (m/z 61.060), from the chemical modifier isopropanol can be used to determine if the curtain plate of a DMS device is contaminated.

Figure 5:
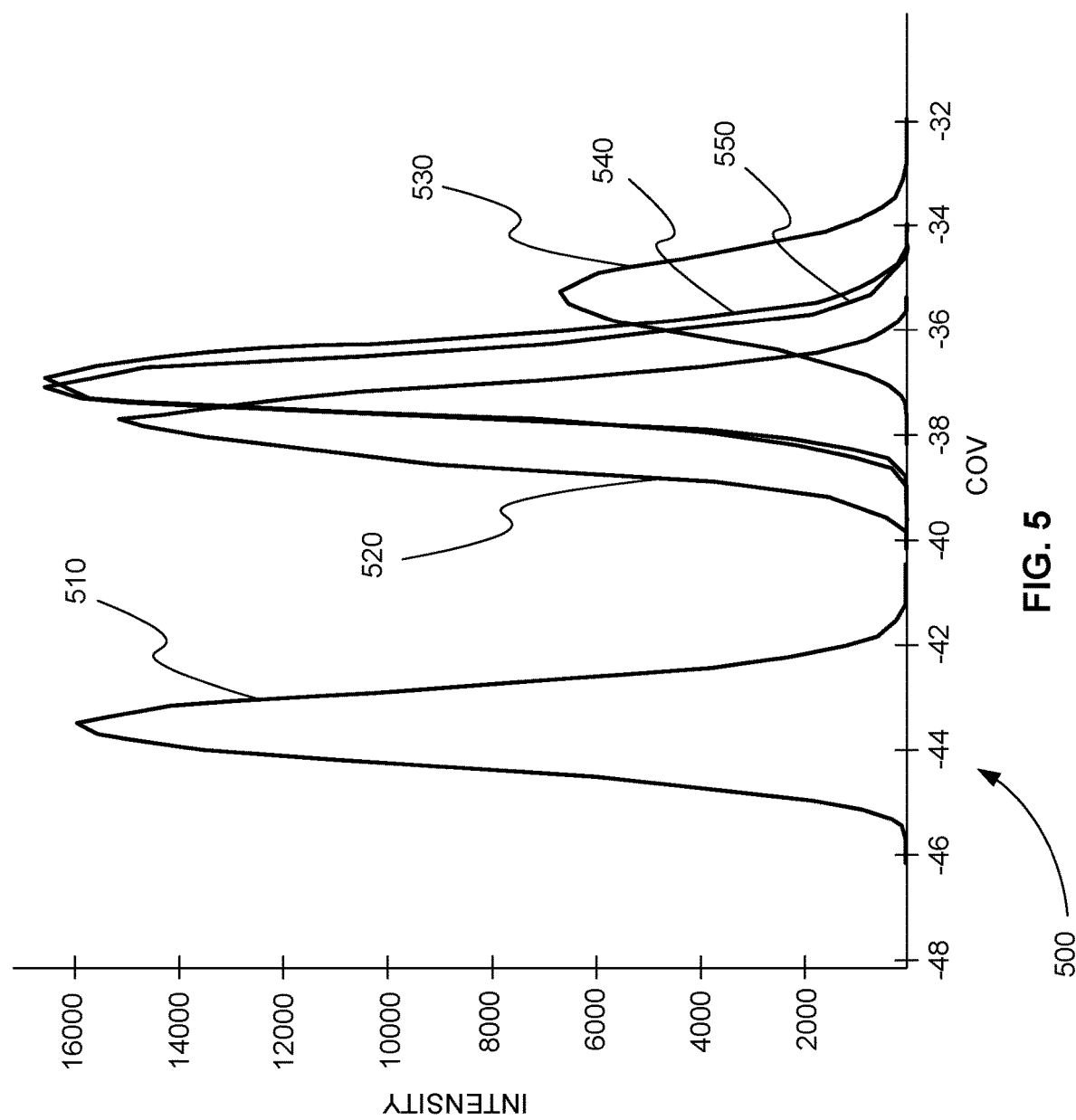
FIG. 5 is an exemplary plot of intensity versus compensation voltage peaks for a derived ion, $[2\times IPA+H]^+$ (m/z 121.110), from the chemical modifier isopropanol measured from one MS-TOF diagnostic experiment using a contaminated curtain plate and from four other MS-TOF diagnostic experiments using new, cleaned, or aggressively baked out curtain plates, in accordance with various embodiments.

FIG. 5 is an exemplary plot 500 of intensity versus compensation voltage peaks for a derived ion, $[2\times IPA+H]^+$ (m/z 121.110), from the chemical modifier isopropanol measured from one MS-TOF diagnostic experiment using a contaminated curtain plate and from four other MS-TOF diagnostic experiments using new, cleaned, or aggressively baked out curtain plates, in accordance with various embodiments. In plot 500, peak 510 is from the diagnostic experiment using a contaminated curtain plate. Peaks 520, 530, 540, and 550 are from the four other MS-TOF diagnostic experiments using new, cleaned, or aggressively baked out curtain plates.

The CoV of peak 510 is significantly shifted away from the CoVs of peaks 520, 530, 540, and 550. Specifically, the CoV, −43.7 V, of peak 510 is shifted from the CoV values of peaks 520, 530, 540, and 550 by more than a predetermined threshold value, such as 5 V. As a result, plot 500 shows that the derived ion, $[2\times IPA+H]^+$ (m/z 121.110), from the chemical modifier isopropanol can be used to determine if the curtain plate of a DMS device is contaminated.

Figure 6:
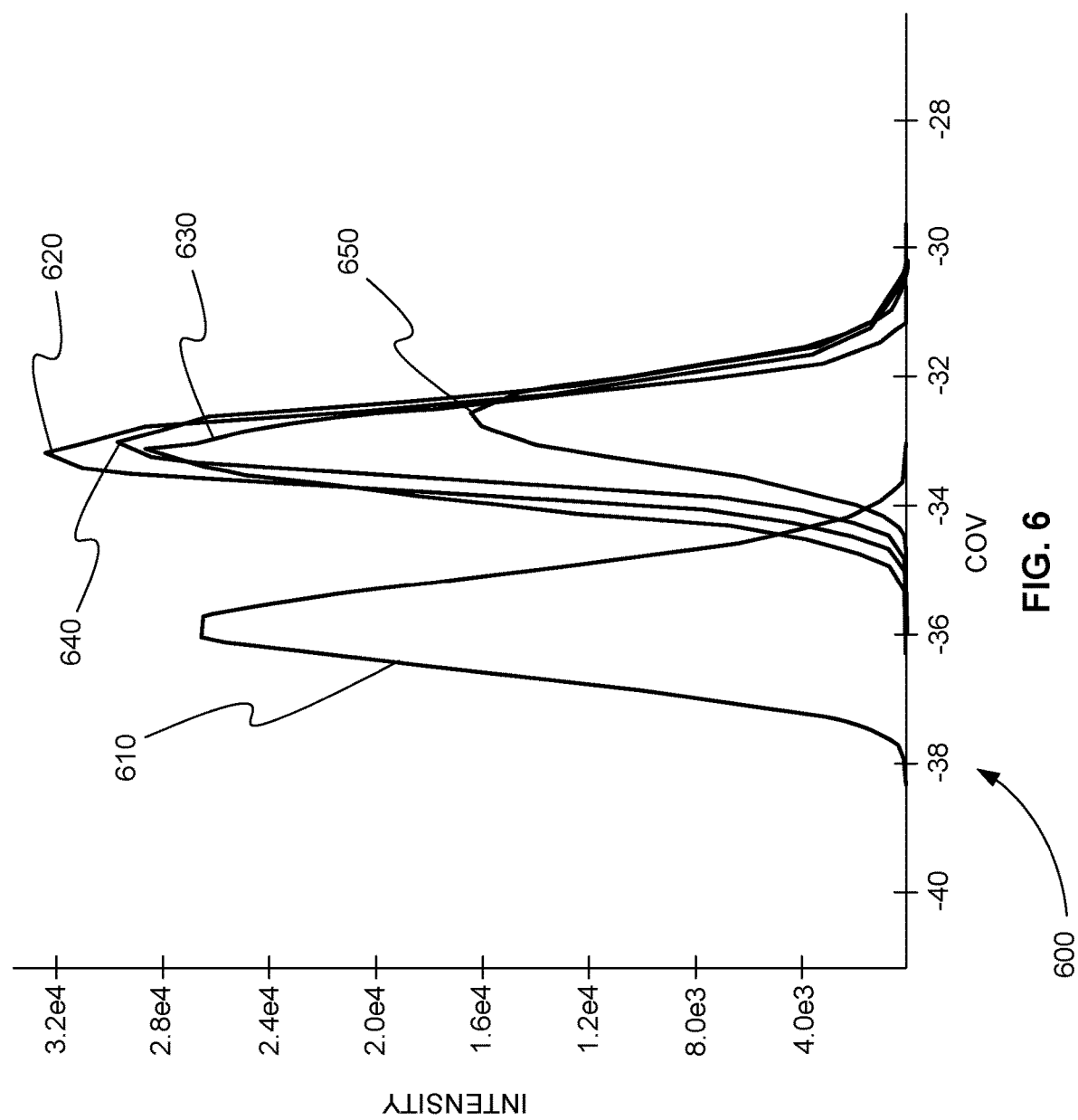
FIG. 6 is an exemplary plot of intensity versus compensation voltage peaks for a derived ion, $[IPA+Na]^+$ (m/z 83.040), from the chemical modifier isopropanol measured from one MS-TOF diagnostic experiment using a contaminated curtain plate and from four other MS-TOF diagnostic experiments using new, cleaned, or aggressively baked out curtain plates, in accordance with various embodiments.

FIG. 6 is an exemplary plot 600 of intensity versus compensation voltage peaks for a derived ion, $[IPA+Na]^+$ (m/z 83.040), from the chemical modifier isopropanol measured from one MS-TOF diagnostic experiment using a contaminated curtain plate and from four other MS-TOF diagnostic experiments using new, cleaned, or aggressively baked out curtain plates, in accordance with various embodiments. In plot 600, peak 610 is from the diagnostic experiment using a contaminated curtain plate. Peaks 620, 630, 640, and 650 are from the four other MS-TOF diagnostic experiments using new, cleaned, or aggressively baked out curtain plates.

The CoV of peak 610 is significantly shifted away from the CoVs of peaks 620, 630, 640, and 650. Specifically, the CoV, −35.8 V, of peak 610 is shifted from the CoV values of peaks 620, 630, 640, and 650 by more than a predetermined threshold value, such as 2 V. As a result, plot 600 shows that the derived ion, $[IPA+Na]^+$ (m/z 83.040), from the chemical modifier isopropanol can be used to determine if the curtain plate of a DMS device is contaminated.

Figure 7:
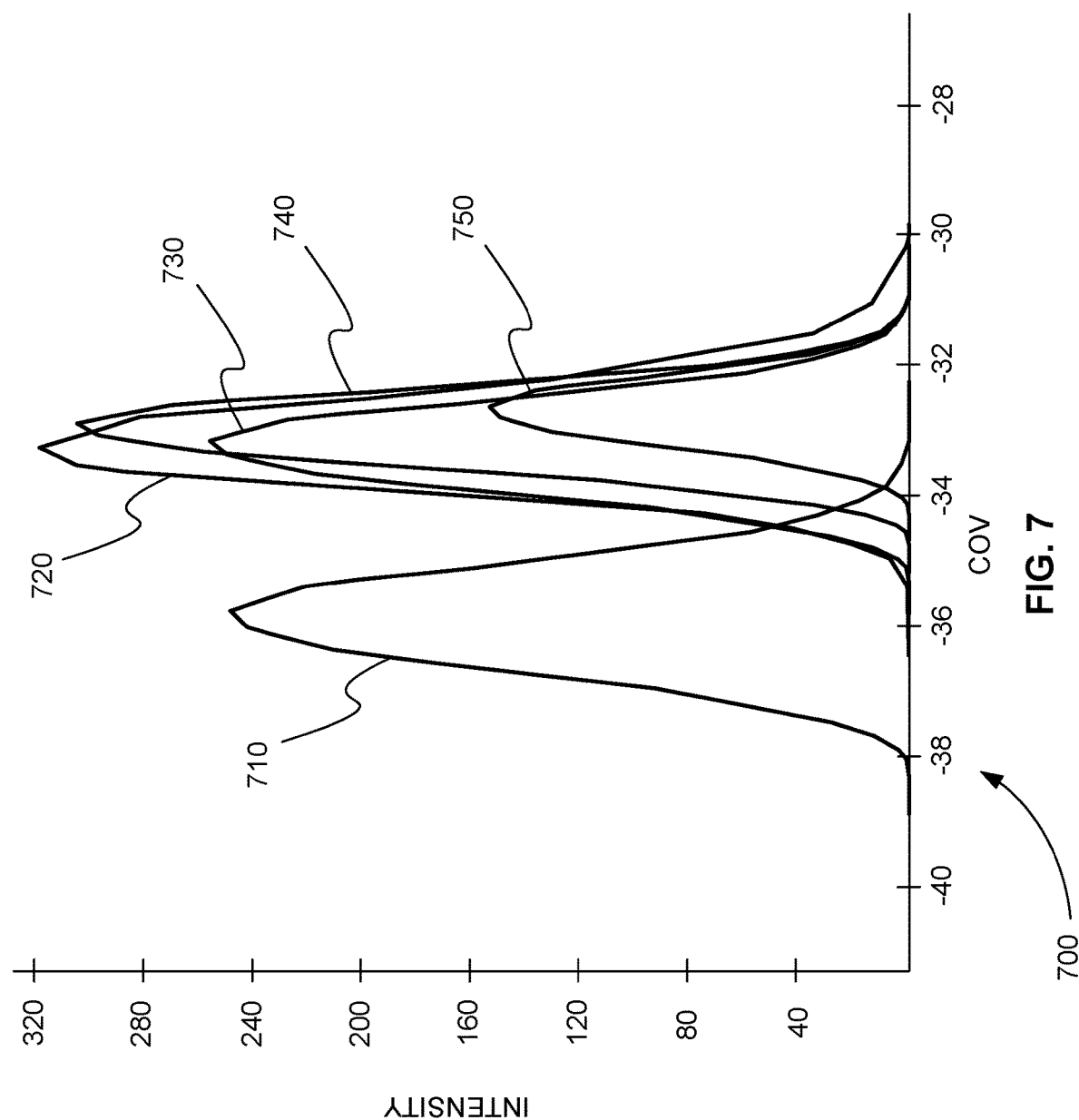
FIG. 7 is an exemplary plot of intensity versus compensation voltage peaks for a derived ion, $[2\times IPA+Na]^+$ (m/z 143.104), from the chemical modifier isopropanol measured from one MS-TOF diagnostic experiment using a contaminated curtain plate and from four other MS-TOF diagnostic experiments using new, cleaned, or aggressively baked out curtain plates, in accordance with various embodiments.

FIG. 7 is an exemplary plot 700 of intensity versus compensation voltage peaks for a derived ion, $[2\times IPA+Na]^+$ (m/z 143.104), from the chemical modifier isopropanol measured from one MS-TOF diagnostic experiment using a contaminated curtain plate and from four other MS-TOF diagnostic experiments using new, cleaned, or aggressively baked out curtain plates, in accordance with various embodiments. In plot 700, peak 710 is from the diagnostic experiment using a contaminated curtain plate. Peaks 720, 730, 740, and 750 are from the four other MS-TOF diagnostic experiments using new, cleaned, or aggressively baked out curtain plates.

The CoV of peak 710 is significantly shifted away from the CoVs of peaks 720, 730, 740, and 750. Specifically, the CoV, −35.8 V, of peak 710 is shifted from the CoV values of peaks 720, 730, 740, and 750 by more than a predetermined threshold value, such as 2 V. As a result, plot 700 shows that the derived ion, $[2\times IPA+Na]^+$ (m/z 143.104), from the chemical modifier isopropanol can be used to determine if the curtain plate of a DMS device is contaminated.

Figure 8:
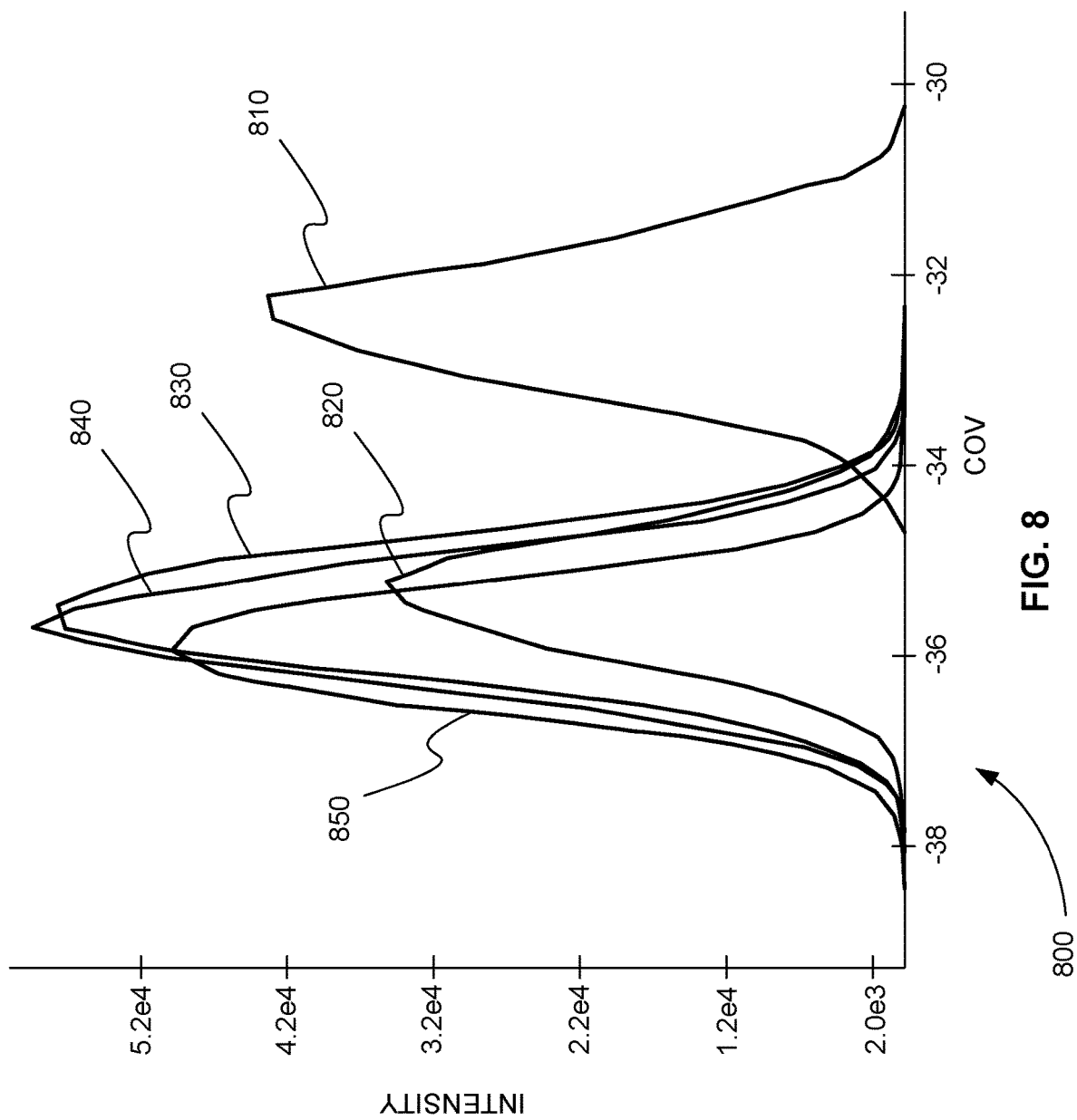
FIG. 8 is an exemplary plot of intensity versus compensation voltage peaks for a derived ion, $[ACN+Na]^+$ (m/z 64.016), from the chemical modifier acetonitrile (ACN) measured from one MS-TOF diagnostic experiment using a contaminated curtain plate and from four other MS-TOF diagnostic experiments using new, cleaned, or aggressively baked out curtain plates, in accordance with various embodiments.

FIG. 8 is an exemplary plot 800 of intensity versus compensation voltage peaks for a derived ion, $[ACN+Na]^+$ (m/z 64.016), from the chemical modifier acetonitrile (ACN) measured from one MS-TOF diagnostic experiment using a contaminated curtain plate and from four other MS-TOF diagnostic experiments using new, cleaned, or aggressively baked out curtain plates, in accordance with various embodiments. In plot 800, peak 810 is from the diagnostic experiment using a contaminated curtain plate. Peaks 820, 830, 840, and 850 are from the four other MS-TOF diagnostic experiments using new, cleaned, or aggressively baked out curtain plates.

The CoV of peak 810 is significantly shifted away from the CoVs of peaks 820, 830, 840, and 850. Specifically, the CoV, −32.2 V, of peak 810 is shifted from the CoV values of peaks 820, 830, 840, and 850 by more than a predetermined threshold value, such as 2.5 V. As a result, plot 800 shows that the derived ion, [ACN+Na]$^+$ (m/z 64.016), from the chemical modifier acetonitrile can be used to determine if the curtain plate of a DMS device is contaminated.

FIGS. 3-8 show that an ion derived from the chemical modifiers, such as methanol, isopropanol, and acetonitrile, can be used to determine if the curtain plate of a DMS device is contaminated. Note that a contaminated curtain plate can shift the CoV value for an ion of a chemical modifier more negatively or more positively. In FIGS. 3-7 the CoV value for an ion of a chemical modifier is shifted more negatively. In FIG. 8, the CoV value for an ion of a chemical modifier is shifted more positively.

In each of FIGS. 3-8, five different types of curtain plates were used. The contaminated curtain plate used was a "dirty" curtain plate that was equilibrated using the standard or conventional recommended conditions. Note that, although the term "dirty" is used here, the curtain plate or the ceramic beads that are stored within the curtain plate are not dirty to the naked eye. As a result, embodiments described herein are directed to systems and methods for objectively determining that a curtain plate is "dirty."

One "clean" curtain plate used was the same contaminated curtain plate but subjected to a more aggressive bakeout procedure prior to equilibrium. The second clean curtain plate used was a different contaminated curtain plate subjected to a more aggressive bakeout procedure prior to equilibrium. The third clean curtain plate used was a different contaminated curtain plate that was subjected to a cleaning of its components and replacement of the ceramic beads stored within and was then subjected to the standard equilibration conditions. The fourth and final clean curtain plate used was a brand-new curtain plate assembled just two weeks before usage.

As displayed in FIGS. 3-8, the data for the contaminated ("dirty") curtain plate stands out as an outlier compared to the CoV shifts displayed for the same ions using the other less contaminated or more aggressively baked out curtain plates. The sample that was analyzed was a mixture of 200 different compounds that was manually infused into the electrospray (ESI) source during the DMS experiments. For each experiment, the SV was 3500V while the CoV was ramped from −50 V or −40 V to +20 V or +30 V. In practice, an analyte sample is not required for a diagnostic experiment involving the chemical modifier.

FIGS. 3-8 show that, depending upon the chemical modifier that a user has chosen to operate their DMS with, the monitoring of a specific chemical modifier-related ion can reveal whether or not the curtain plate condition will contribute to an unexpected CoV shift for their analyte ion. In other words, a dirty curtain plate can cause shifts in the measured CoV of a compound. A user must either clean the curtain plate or equilibrate for longer. However, they are often unaware that the instrument requires this treatment. In various embodiments, a solvent ion is used as a marker for the shift in CoV in a diagnostic experiment, allowing the user to compensate for this shift by equilibrating longer or cleaning.

Figure 9:
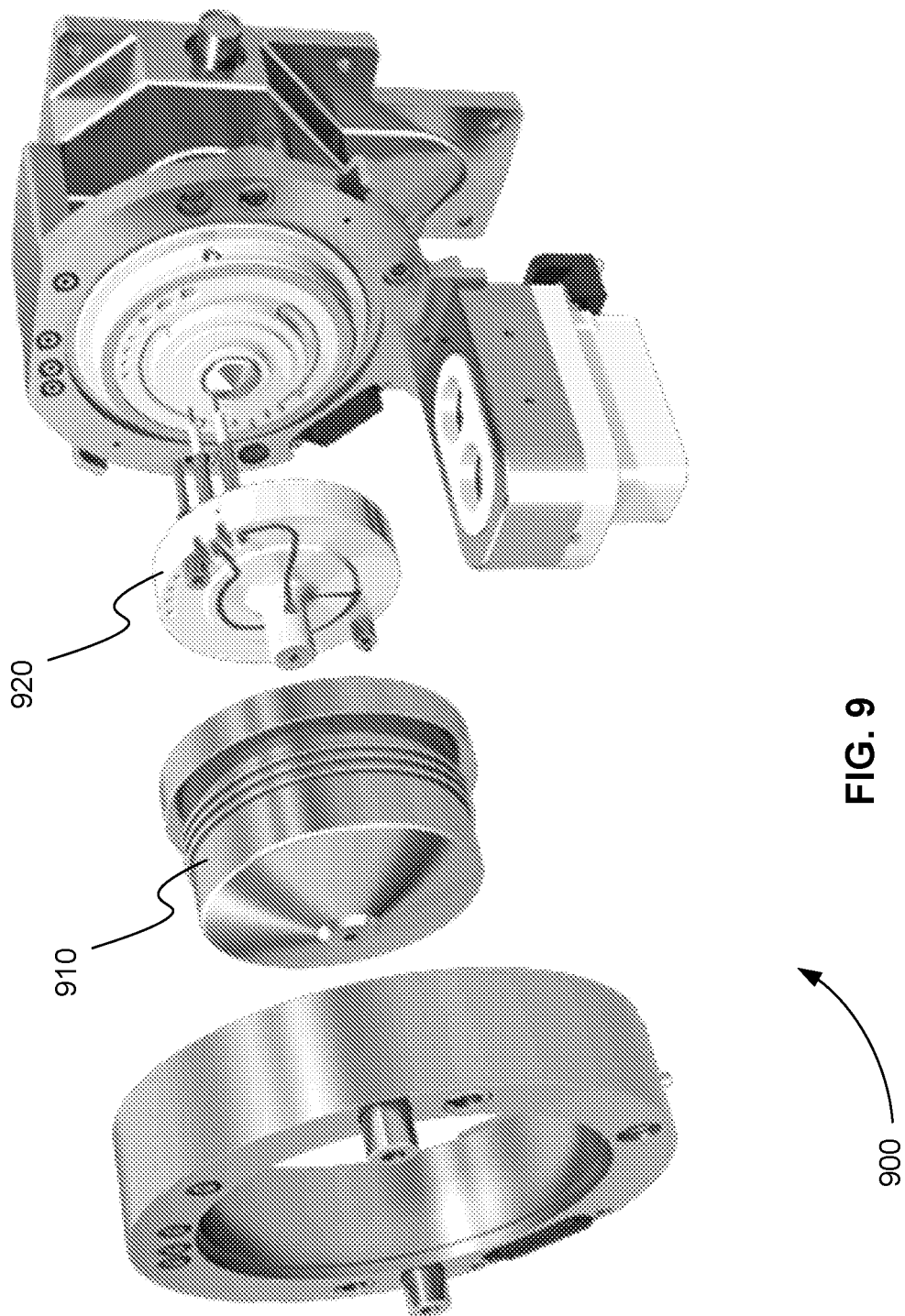
FIG. 9 is an exemplary three-dimensional (3D) exploded image of a DMS device, in accordance with various embodiments.

FIG. 9 is an exemplary three-dimensional (3D) exploded image 900 of a DMS device, in accordance with various embodiments. Specifically, the SELEXION DMS device produced by SCIEX of Framingham, MA is depicted in image 900. This DMS device includes cylindrical curtain plate 910, which surrounds DMS cell 920.

Figure 10:
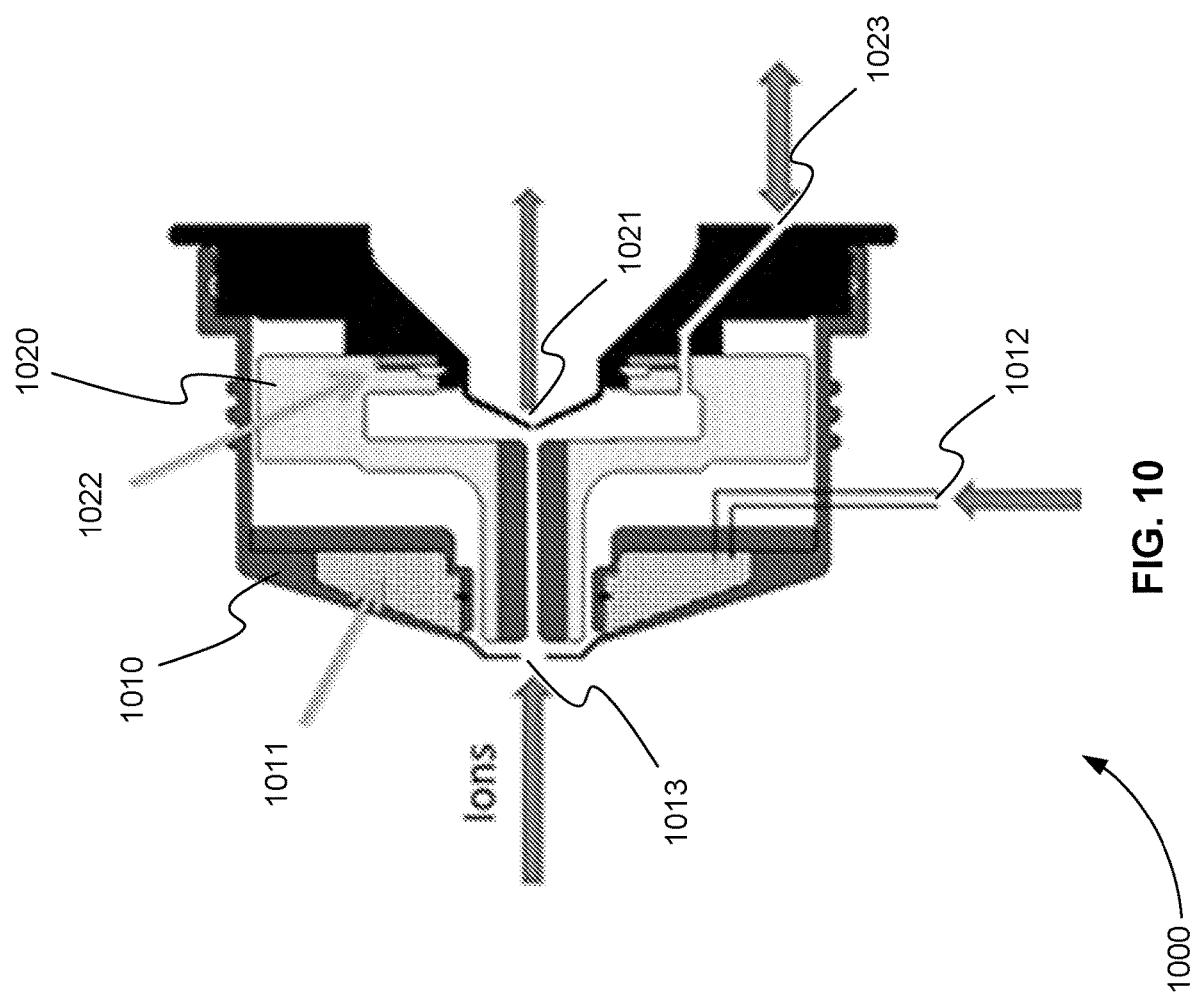
FIG. 10 is an exemplary two-dimensional (2D) cross-sectional diagram of a DMS device, in accordance with various embodiments.

FIG. 10 is an exemplary two-dimensional (2D) cross-sectional diagram 1000 of a DMS device, in accordance with various embodiments. In FIG. 10, the DMS device includes curtain plate 1010 and DMS cell 1020. Curtain plate 1010 includes ceramic beads 1011. Ceramic beads 1011 act as a heat exchanger, for example.

Curtain plate 1010 receives a curtain gas, which can be, but is not limited to, nitrogen ($N_2$), through port 1012. A chemical modifier, as described above, is added to the curtain gas and also enters curtain plate 1010 through port 1012.

The chemical modifier is ionized near entrance orifice 1013 of curtain plate 1010, for example. This ionization is postulated to occur as ionized clusters of ESI solvent leave the ion source and enter the DMS curtain plate environment. Here, these ionized solvent clusters interact with chemical modifier molecules that have been in contact with the DMS curtain plate and any contaminating species therein. For example, the chemical modifier is ionized from scavenging protons from other compounds ionized by electrospray. This happens due to differences in gas-phase basicity.

As these ionized clusters and chemical modifier molecules interact in the high-pressure entrance of the DMS (i.e., 1 atmosphere), ionization of the chemical modifier molecules can take place, forming the aforementioned diagnostic ions discussed in this work. Ions derived from the chemical modifier pass through DMS cell 1020. The CoV value of DMS cell 1020 is ramped as the ions are passing through DMS cell 1020.

A mass spectrometer (not shown) located at exit orifice 1021 of DMS cell 1020 selects at least one ion derived from the chemical modifier and mass analyzes the at least one ion at each of the different CoV values applied to DMS cell 1020. The CoV value that produces the highest intensity for the at least one ion is compared to a known CoV value or range of known CoV values that are known to produce the highest intensity for the at least one ion when the curtain plate is uncontaminated. If the CoV value is shifted from the known CoV value or range of known CoV values by more than a predetermined threshold value, then the curtain plate is found to be contaminated.

DMS cell 1020 further includes heater 1022. DMS cell 1020 receives a throttle gas, which can be, but is not limited to, nitrogen ($N_2$), through port 1023.

System for Determining Curtain Plate Contamination

Figure 11:
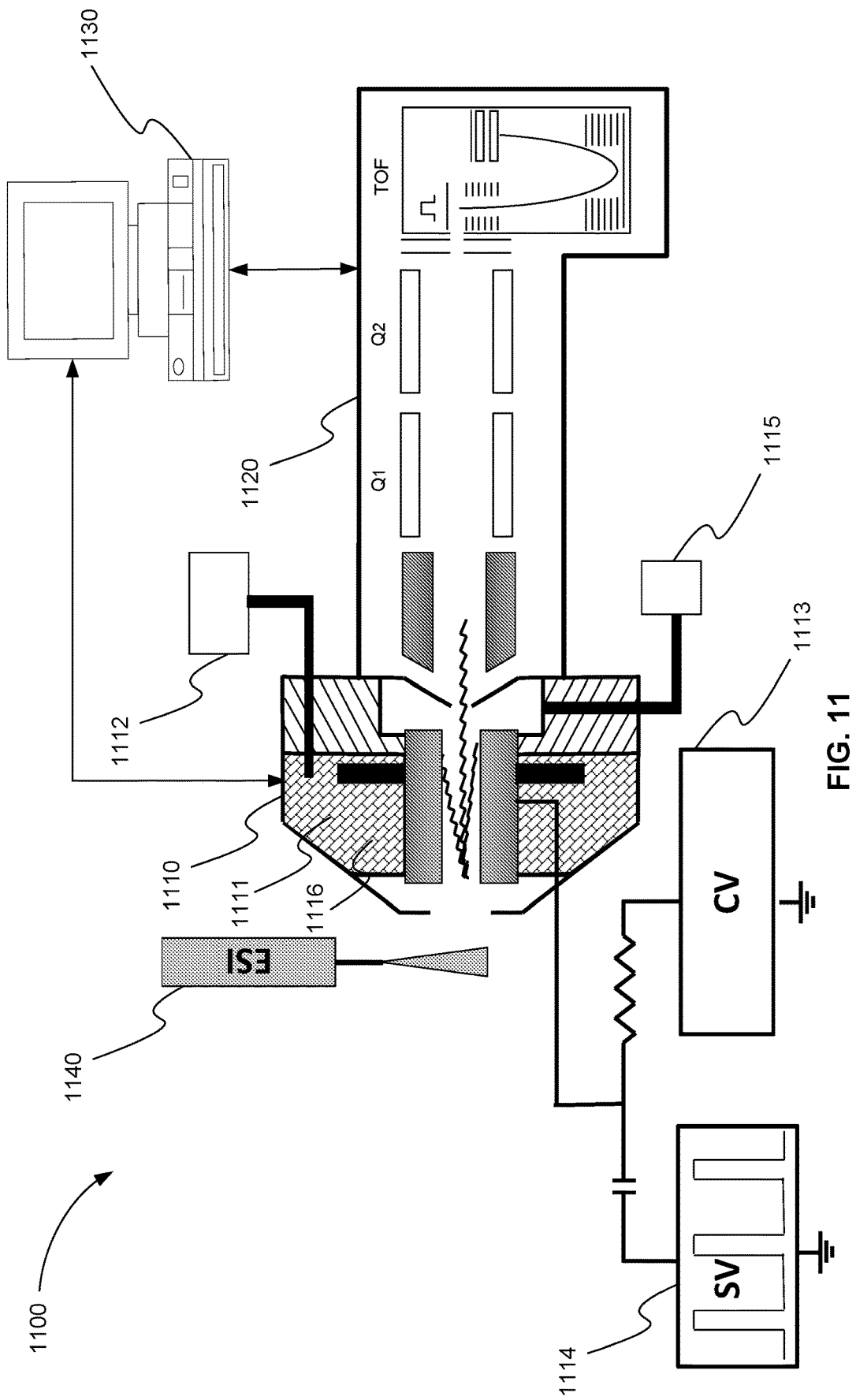
FIG. 11 is a schematic diagram of a system for determining if a curtain plate of a DMS device is contaminated, in accordance with various embodiments.

FIG. 11 is a schematic diagram 1100 of a system for determining if a curtain plate of a DMS device is contaminated and/or if the system is suitable for performing an analysis, in accordance with various embodiments. The system of FIG. 11 includes DMS device 1110, mass spectrometer 1120, and processor 1130.

DMS device 1110 includes curtain plate 1111 and curtain assembly 1116. DMS device 1110 receives a curtain gas that includes a chemical modifier into curtain plate 1111. The curtain gas and the chemical modifier are received from reservoir 1112, for example. DMS device 1110 also receives a throttle gas. The throttle gas is received from reservoir 1115, for example.

Before or while receiving ions of an analyte, DMS device 1110 performs a diagnostic experiment in which CoV 1113 of DMS device 1110 is stepped through a series of values in order to apply different CoV values to at least one precursor ion derived from the chemical modifier. SV 1114 of DMS device 1110 is held constant, for example. Also during the diagnostic experiment, for each CoV value of the series of values, mass spectrometer 1120 selects the at least one precursor ion and mass analyzes the at least one precursor ion, producing an intensity for each CoV value of the series of values for the at least one precursor ion.

Mass spectrometer 1120 is shown in FIG. 11 as a quadrupole time-of-flight (QTOF) device. A QTOF device can obtain a mass spectrum for each CoV value of the series of values, for example. However, mass spectrometer 1120 can be any type of mass spectrometer including, but not limited to, a triple quadrupole (QqQ) device. A QqQ device, for example, can perform an MRM for each CoV value of the series of values.

Mass spectrometer 1120 calculates an intensity versus CoV value peak from the intensities measured for each CoV value of the series of values for the at least one precursor ion. Mass spectrometer 1120 calculates a representative CoV value for the peak. Mass spectrometer 1120 calculates an absolute value of the difference between the representative CoV value and a known CoV value or a range of known CoV values that represent an uncontaminated curtain plate. If the absolute value of the difference is greater than or equal to a predetermined threshold value, mass spectrometer 1120 determines that the curtain plate is contaminated.

In various embodiments, system 1100 further includes a display device (not shown) to provide information to a user of DMS device 1110 and mass spectrometer 1120 about the status of curtain plate 1111 of DMS device 1110. The display device can be a display device of processor 1130, for example. If it is determined that curtain plate 1111 is contaminated, mass spectrometer 1120 displays information on the display device describing that curtain plate 1111 is contaminated.

In various embodiments, if the absolute value of the difference is less than the predetermined threshold value, mass spectrometer 1120 determines that curtain plate 1111 is uncontaminated. Mass spectrometer 1120 then displays information on the display device describing that curtain plate 1111 is uncontaminated.

In various embodiments, the chemical modifier is methanol (MeOH). The at least one precursor ion derived from the chemical modifier can include methanol converted into a precursor ion by the addition of an alkali metal ion.

In various embodiments, the alkali metal used is sodium. The at least one precursor ion derived from the chemical modifier can include one molecule of methanol converted into a precursor on by the addition of a sodium ion ([MeOH+Na]$^+$), for example.

In various embodiments, the chemical modifier is isopropanol (IPA). The at least one precursor ion derived from the chemical modifier can include isopropanol converted into a precursor on by the addition of a proton. For example, the at least one precursor ion derived from the chemical modifier can include one molecule of isopropanol converted into a precursor ion by the addition of a proton ([IPA+H]$^+$). Also, the at least one precursor ion derived from the chemical modifier can include two molecules of isopropanol converted into a precursor ion by the addition of a proton ([2×IPA+H]$^+$).

In various embodiments, the at least one precursor ion derived from the chemical modifier can include isopropanol converted into a precursor ion by the addition of an alkali metal. The alkali metal used can be sodium. For example, the at least one precursor ion derived from the chemical modifier can include one molecule of isopropanol converted into a precursor ion by the addition of a sodium ion ([IPA+Na]$^+$). Also, the at least one precursor ion derived from the chemical modifier can include two molecules of isopropanol converted into a precursor ion by t addition of a sodium ion ([2×IPA+Na]$^+$).

In various embodiments the chemical modifier is acetonitrile (ACN). The at least one precursor ion derived from the chemical modifier can include acetonitrile converted into a precursor ion by the addition of an alkali metal ion.

In various embodiments, the alkali metal used is sodium. The at least one precursor ion derived from the chemical modifier can include one molecule of acetonitrile converted into a precursor ion by the addition of a sodium ion ([ACN+Na]$^+$), for example.

In various embodiments, mass spectrometer 1120 calculates a representative CoV value for the peak by selecting the CoV value of the highest intensity of the peak. In various alternative embodiments, mass spectrometer 1120 can calculate a representative CoV value from a statistical measure of the peak including, but not limited to, the mean or average CoV value.

In various embodiments, system 1100 further includes ion source 1140. Ion source 114s is used to ionize an analyte sample. Ion source 1140 is shown as performing electrospray ionization (ESI) (e.g., nanospray) but can be any type of ion source. As described above, the diagnostic experiment can be performed before or during analysis of an analyte of an analyte sample.

In various embodiments, processor 1130 is used to control or provide instructions to DMS device 1110 and tandem mass spectrometer 1120 and to analyze data collected. Processor 1130 controls or provides instructions by, for example, controlling one or more voltage, current, or pressure sources (not shown). Processor 1130 can be a separate device as shown in FIG. 11 or can be a processor or controller of one or more devices of mass spectrometer 1120, for example. Processor 1130 can be, but is not limited to, a controller, a computer, a microprocessor, the computer system of FIG. 1, or any device capable of sending and receiving control signals and data.

Method for Determining Curtain Plate Contamination

Figure 12:
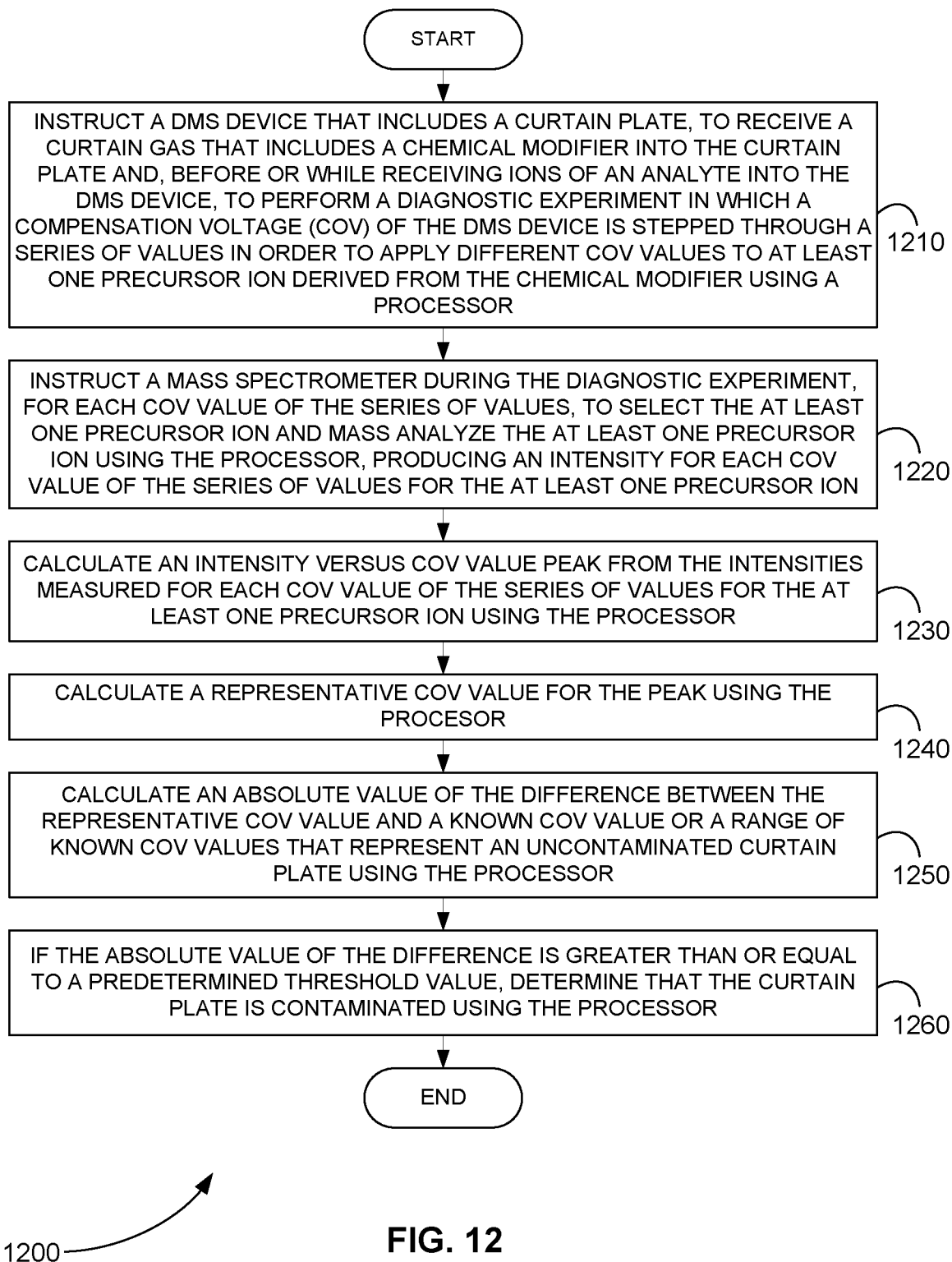
FIG. 12 is a flowchart showing a method for determining if a curtain plate of a DMS device is contaminated, in accordance with various embodiments.

FIG. 12 is a flowchart showing a method 1200 for if a DMS device is suitable to perform an analysis, such as determining if a curtain plate of a DMS is contaminated, in accordance with various embodiments.

In step 1210 of method 1200, a DMS device that includes a curtain plate is instructed to receive a curtain gas that includes a chemical modifier into the curtain plate using a processor. Before or while receiving ions of an analyte into the DMS device, the DMS device is also instructed to perform a diagnostic experiment using the processor. In the diagnostic experiment, a CoV of the DMS device is stepped through a series of values in order to apply different CoV values to at least one precursor ion derived from the chemical modifier.

In step 1220, during the diagnostic experiment, a mass spectrometer is instructed, for each CoV value of the series of values, to select the at least one precursor ion and mass analyze the at least one precursor ion using the processor. An intensity is produced for each CoV value of the series of values for the at least one precursor ion.

In step 1230, an intensity versus CoV value peak is calculated from the intensities measured for each CoV value of the series of values for the at least one precursor ion using the processor.

In step 1240, a representative CoV value is calculated for the peak using the processor.

In step 1250, an absolute value of the difference between the representative CoV value and a known CoV value or a range of known CoV values that represent an uncontaminated curtain plate is calculated using the processor.

In step 1260, if the absolute value of the difference is greater than or equal to a predetermined threshold value, the curtain plate is determined to be contaminated using the processor.

Computer Program Product for Determining Curtain Plate Contamination

In various embodiments, computer program products include a tangible computer-readable storage medium whose contents include a program with instructions being executed on a processor so as to perform a method for determining if a DMS device is suitable for performing an analysis such as for example determining if a curtain plate of a DMS device is contaminated. This method is performed by a system that includes one or more distinct software modules.

Figure 13:
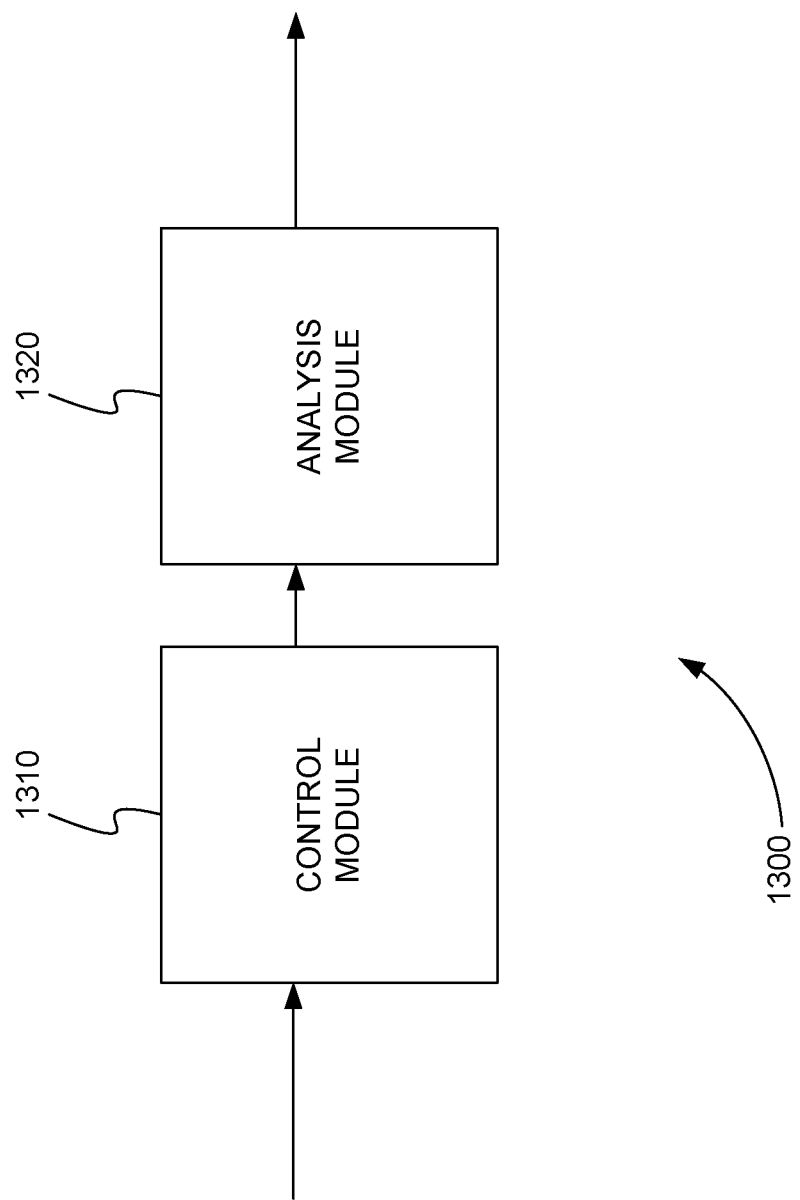
FIG. 13 is a schematic diagram of a system that includes one or more distinct software modules that perform a method for determining if a curtain plate of a DMS device is contaminated, in accordance with various embodiments.

FIG. 13 is a schematic diagram of a system 1300 that includes one or more distinct software modules that perform a method for determining if a curtain plate of a DMS device is contaminated, in accordance with various embodiments. System 1300 includes a control module 1310 and an analysis module 1320.

Control module 1310 instructs a DMS device that includes a curtain plate to receive a curtain gas that includes a chemical modifier into the curtain plate using a processor. Before or while receiving ions of an analyte into the DMS device, control module 1310 instructs the DMS device to also perform a diagnostic experiment. In the diagnostic experiment, a CoV of the DMS device is stepped through a series of values in order to apply different CoV values to at least one precursor ion derived from the chemical modifier.

During the diagnostic experiment, for each CoV value of the series of values, control module 1310 instructs a mass spectrometer to select the at least one precursor ion and mass analyze the at least one precursor ion. An intensity is produced for each CoV value of the series of values for the at least one precursor ion.

Analysis module 1320 calculates an intensity versus CoV value peak from the intensities measured for each CoV value of the series of values for the at least one precursor ion. Analysis module 1320 calculates a representative CoV value for the peak using the processor. Analysis module 1320 calculates an absolute value of the difference between the representative CoV value and a known CoV value or a range of known CoV values that represent an uncontaminated curtain plate. If the absolute value of the difference is greater than or equal to a predetermined threshold value, Analysis module 1320 determines that the curtain plate is contaminated.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for determining if a curtain plate of a differential mobility spectrometry (DMS) device is contaminated, comprising:

a DMS device that includes a curtain plate, receives a curtain gas that includes a chemical modifier into the curtain plate, and, before or while receiving ions of an analyte into the DMS device, performs a diagnostic experiment in which a compensation voltage (CoV) of the DMS device is stepped through a series of values in order to apply different CoV values to at least one precursor ion derived from the chemical modifier; and a mass spectrometer that, during the diagnostic experiment, for each CoV value of the series of values, selects the at least one precursor ion and mass analyzes the at least one precursor ion, producing an intensity for each CoV value of the series of values for the at least one precursor ion, calculates an intensity versus CoV value peak from the intensities measured for each CoV value of the series of values for the at least one precursor ion, calculates a representative CoV value for the peak, calculates an absolute value of the difference between the representative CoV value and a known CoV value or a range of known CoV values that represent an uncontaminated curtain plate, and, if the absolute value of the difference is greater than or equal to a predetermined threshold value, determines that the curtain plate is contaminated.

2. The system of claim 1, further comprising a display device, wherein if it is determined that the curtain plate is contaminated, the mass spectrometer displays information on the display device describing that the curtain plate is contaminated.

3. The system of claim 1, further comprising a display device, wherein if the absolute value of the difference is less than the predetermined threshold value, the mass spectrometer determines that the curtain plate is uncontaminated and displays information on the display device describing that the curtain plate is uncontaminated.

4. The system of claim 1, wherein the chemical modifier comprises methanol (MeOH).

5. The system of claim 4, wherein at least one precursor ion derived from the chemical modifier comprises methanol converted into a precursor ion by the addition of an alkali metal ion.

6. The system of claim 4, wherein at least one precursor ion derived from the chemical modifier comprises one molecule of methanol converted into a precursor ion by the addition of a sodium ion ($[MeOH+Na]^+$).

7. The system of claim 1, wherein the chemical modifier comprises isopropanol (IPA).

8. The system of claim 7, wherein at least one precursor ion derived from the chemical modifier comprises one molecule of isopropanol converted into a precursor ion by the addition of a proton ($[IPA+H]^+$).

9. The system of claim 7, wherein at least one precursor ion derived from the chemical modifier comprises two molecules of isopropanol converted into a precursor ion by the addition of a proton ($[2 \times IPA+H]^+$).

10. The system of claim 7, wherein at least one precursor ion derived from the chemical modifier comprises isopropanol converted into a precursor ion by the addition of an alkali metal ion.

11. The system of claim 1, wherein the chemical modifier comprises acetonitrile (ACN).

12. The system of claim 10, wherein at least one precursor ion derived from the chemical modifier comprises one molecule of acetonitrile converted into a precursor ion by the addition of a sodium ion ($[ACN+Na]^+$).

13. The system of claim 12, wherein at least one precursor ion derived from the chemical modifier comprises acetonitrile converted into a precursor ion by the addition of an alkali metal ion.

14. A method for determining if a curtain plate of a differential mobility spectrometry (DMS) device is contaminated, comprising:

instructing a DMS device that includes a curtain plate to receive a curtain gas that includes a chemical modifier into the curtain plate and, before or while receiving ions of an analyte into the DMS device, to perform a diagnostic experiment in which a compensation voltage (CoV) of the DMS device is stepped through a series of values in order to apply different CoV values to at least one precursor ion derived from the chemical modifier using a processor; and instructing a mass spectrometer during the diagnostic experiment, for each CoV value of the series of values, to select the at least one precursor ion and mass analyze the at least one precursor ion using the processor, producing an intensity for each CoV value of the series of values for the at least one precursor ion;

calculating an intensity versus CoV value peak from the intensities measured for each CoV value of the series of values for the at least one precursor ion using the processor;

calculating a representative CoV value for the peak using the processor;

calculating an absolute value of the difference between the representative CoV value and a known CoV value or a range of known CoV values that represent an uncontaminated curtain plate using the processor; and if the absolute value of the difference is greater than or equal to a predetermined threshold value, determining that the curtain plate is contaminated using the processor.

15. A computer program product, comprising a non-transitory and tangible computer-readable storage medium whose contents include a program with instructions being executed on a processor to perform a method for determining if a curtain plate of a differential mobility spectrometry (DMS) device is contaminated, the method comprising:

providing a system, wherein the system comprises one or more distinct software modules, and wherein the distinct software modules comprise a control module and an analysis module;

instructing a DMS device that includes a curtain plate to receive a curtain gas that includes a chemical modifier into the curtain plate and, before or while receiving ions of an analyte into the DMS device, to perform a diagnostic experiment in which a compensation voltage (CoV) of the DMS device is stepped through a series of values in order to apply different CoV values to at least one precursor ion derived from the chemical modifier using the control module; and instructing a mass spectrometer during the diagnostic experiment, for each CoV value of the series of values, to select the at least one precursor ion and mass analyze the at least one precursor ion using the control module, producing an intensity for each CoV value of the series of values for the at least one precursor ion;

calculating an intensity versus CoV value peak from the intensities measured for each CoV value of the series of values for the at least one precursor ion using the analysis module;

calculating a representative CoV value for the peak using the processor;

calculating an absolute value of the difference between the representative CoV value and a known CoV value or a range of known CoV values that represent an uncontaminated curtain plate using the analysis module; and if the absolute value of the difference is greater than or equal to a predetermined threshold value, determining that the curtain plate is contaminated using the analysis module.

16. A system for determining if a differential mobility spectrometry (DMS) device is suitable to perform an analysis, comprising:

a DMS device that includes a curtain assembly, the current assembly being configured to receive a curtain gas that includes a chemical modifier, the DMS device being configured to, before or while receiving ions, perform a diagnostic experiment in which a compensation voltage (CoV) of the DMS device is stepped through a series of values in order to transmit at least one precursor ion derived from the chemical modifier present in the curtain gas; and a mass spectrometer that, during the diagnostic experiment, for each CoV value of the series of values, selects the at least one derived precursor ion and mass analyzes the at least one derived precursor ion, producing an intensity for each CoV value of a series of values for the at least one derived precursor ion, calculates an intensity versus CoV value peak from the intensities measured for each CoV value of the series of values for the at least one derived precursor ion, calculates a representative CoV values for the peak, calculates an absolute value of the difference between the representative CoV value and a known CoV value or a range of known CoV values that represents a properly functional DMS, and if the absolute value of the difference is greater than or equal to a predetermined threshold value, determines that the system is not suitable for analysis.

* * * * *